(12) United States Patent
Blaschke et al.

(10) Patent No.: US 9,334,356 B2
(45) Date of Patent: May 10, 2016

(54) FILM MADE OF POLYARYLEETHERKETONE

(75) Inventors: Joerg Blaschke, Remscheid (DE); Kirsten Luetzeler, Muenster (DE); Walter Zink, Muenster (DE); Ricardo Luiz Willemann, Shanghai (CN); Kathrin Salwiczek, Marl (DE); Georg Schaefer, Datteln (DE)

(73) Assignee: Evonik Degussa GmbH, Essen (DE)

( * ) Notice: Subject to any disclaimer, the term of this patent is extended or adjusted under 35 U.S.C. 154(b) by 1101 days.

(21) Appl. No.: 13/394,428

(22) PCT Filed: Oct. 19, 2010

(86) PCT No.: PCT/EP2010/065714
§ 371 (c)(1),
(2), (4) Date: Mar. 6, 2012

(87) PCT Pub. No.: WO2011/048093
PCT Pub. Date: Apr. 28, 2011

(65) Prior Publication Data
US 2012/0196113 A1    Aug. 2, 2012

(30) Foreign Application Priority Data
Oct. 21, 2009 (DE) .......................... 10 2009 045 892

(51) Int. Cl.
| | | |
|---|---|---|
| B32B 15/08 | (2006.01) | |
| B29C 47/88 | (2006.01) | |
| B32B 27/00 | (2006.01) | |
| C08L 61/16 | (2006.01) | |
| C08K 3/38 | (2006.01) | |
| C08G 61/12 | (2006.01) | |
| C08J 5/18 | (2006.01) | |
| C08L 71/00 | (2006.01) | |
| B32B 27/06 | (2006.01) | |
| B32B 27/20 | (2006.01) | |
| C08L 65/00 | (2006.01) | |

(52) U.S. Cl.
CPC .................. *C08G 61/127* (2013.01); *C08J 5/18* (2013.01); *C08L 71/00* (2013.01); *B32B 15/08* (2013.01); *B32B 27/06* (2013.01); *B32B 27/20* (2013.01); *C08G 2261/3442* (2013.01); *C08G 2650/40* (2013.01); *C08J 2371/10* (2013.01); *C08L 65/00* (2013.01); *Y10T 428/269* (2015.01)

(58) Field of Classification Search
CPC ... Y10T 428/269; C08G 61/127; C08L 71/00; C08K 3/38; C08K 2003/382–2003/385; H05K 1/03; H05K 1/0313–1/0373; H05K 1/0393

See application file for complete search history.

(56) References Cited

U.S. PATENT DOCUMENTS

| | | | |
|---|---|---|---|
| 4,654,263 A | | 3/1987 | Cox |
| 4,975,479 A | * | 12/1990 | Satake et al. .................. 524/100 |
| 5,011,627 A | * | 4/1991 | Lutz et al. ...................... 252/512 |
| 6,236,061 B1 | | 5/2001 | Walpita |
| 6,927,249 B1 | | 8/2005 | Lee et al. |
| 2003/0181560 A1 | * | 9/2003 | Kawaguchi et al. .......... 524/424 |
| 2005/0070657 A1 | | 3/2005 | Elkovitch et al. |
| 2008/0153959 A1 | * | 6/2008 | Charati et al. ................ 524/404 |

FOREIGN PATENT DOCUMENTS

| | | | | |
|---|---|---|---|---|
| EP | 182580 A2 | * | 5/1986 | ............... C08K 3/34 |
| EP | 1 234 857 A1 | | 8/2002 | |
| EP | 1 314 760 A1 | | 5/2003 | |
| JP | 60-238357 A | | 11/1985 | |
| JP | 64-43536 A | | 2/1989 | |
| JP | 2002-69309 A | | 3/2002 | |
| JP | 2003-26914 A | | 1/2003 | |
| JP | 2003-128931 A | | 5/2003 | |
| JP | 2003-128943 A | | 5/2003 | |
| JP | 2003-128944 A | | 5/2003 | |
| JP | 2006-291217 A | | 10/2006 | |
| JP | 2007-197715 A | | 8/2007 | |
| RU | 2 222 123 | | 1/2004 | |
| WO | WO 96/41836 A1 | | 12/1996 | |
| WO | 99 44959 | | 9/1999 | |
| WO | WO 2007/107293 A | | 9/2007 | |
| WO | 2010 101822 | | 9/2010 | |

OTHER PUBLICATIONS

International Search Report Issued Jan. 24, 2011 in PCT/EP10/65714 Filed Oct. 19, 2010.

\* cited by examiner

*Primary Examiner* — Prashant J Khatri
(74) *Attorney, Agent, or Firm* — Oblon, McClelland, Maier & Neustadt, L.L.P.

(57) ABSTRACT

The invention relates to a molding compound, comprising the following components: a) 60 to 96% by weight polyaryletherketone, b) 2 to 25% by weight hexagonal bornite, and c) 2 to 25% by weight talcum, wherein the sum of the parts by weight of components a), b), and c) is 100. Said compounds can be used to produce a film having a thickness of 5 to 1200 μm, which is suitable for producing dimensionally stable circuit boards.

16 Claims, No Drawings

FILM MADE OF POLYARYLEETHERKETONE

The invention relates to a foil made of polyarylene ether ketone, where the foil can be used for various technical applications, for example for flexible circuitboards.

The production and use of foils made of polyarylene ether ketones is prior art. The foils are used for a wide variety of technical applications, for example as insulation material or as backing of functional layers. In these processes, as a function of requirements, polyarylene ether ketones are mixed with various fillers and optionally further polymers to give compounded materials or to give blends, and these are then further processed to give foils. Foil thicknesses below 10 μm have now been achieved. The property profiles place particular emphasis on high resistance to solvents and to temperature change, together is with low shrinkage and low expansion, and also high resistance to tear and to tear propagation.

As a function of conduct of the extrusion process, polyarylene ether ketones can be processed to give either amorphous foils or semicrystalline foils. Production of foils with minimum and uniform shrinkage requires maximization of semicrystallinity and minimization of orientation of the polymer molecules. In the extrusion process, the amorphous melt of the polyarylene ether ketone emerges from the die onto what are known as the chill rolls, where complicated process technology is required, with very narrow processing latitude, for conversion to foils with maximum semicrystallinity. However, the process technology of this process makes it very difficult to adjust the orientations of the polymer molecules to give a completely isotropic foil. The result is therefore a varying shrinkage property profile which occasionally varies greatly across the width of the foil web and can prove problematic or even unacceptable during the further processing and finishing of the foils. It is entirely possible that the shrinkage values within a semicrystalline extruded polyarylene ether ketone foil vary from zero to several percent, depending on the location of sampling of the foil web for shrinkage measurement. However, specifically for further processing or use in relatively high temperature ranges it is important that the foils have maximum dimensional stability.

The foil to which the present invention relates is laminated with a metal foil in relevant applications, for example during further processing to give flexible circuitboards (flexible printed circuitboards, FCB). It is necessary to ensure here that the required layflat of the laminate is retained in the event of temperature changes during the production process or in the course of continual use. By way of example, curl or corrugation of the laminate is not permitted. To this end, the area coefficients of expansion of the thin polyarylene ether ketone foils and thin metal foils fixed to one another must be almost identical.

EP 1 314 760 A1 describes a foil which is intended for use in printed circuits and which can be composed of a polyarylene ether ketone molding composition. The molding composition comprises from 15 to 50% by weight of a "flaky" filler, which by way of example can be boron nitride. The said addition reduces shrinkage during production, and also reduces thermal expansion, and the foil is therefore intended to be suitable for producing a laminate with a copper foil.

EP 1 234 857 A1 discloses a molding composition for producing foils for FCBs based by way of example on polyether ether ketone (PEEK), where addition of a "flaky" filler with certain parameters (preferably mica; talc also being mentioned) has been used to reduce shrinkage and also thermal expansion. Corresponding disclosures based on talc and, respectively, acidic magnesium metasilicate are found in JP 2007-197715A, JP 2003-128943A and JP 2003-128944A.

WO 2007/107293 describes an expansion measurement strip in which the backing layer is composed of a PEEK molding composition which comprises talc or boron nitride as filler. Joint use of these two fillers is not disclosed.

Finally, JP 2003-128931A describes a molding composition for producing foils for FCBs based on a wide variety of polymers, for example polyarylene ether ketone. The molding composition uses from 5 to 50% by weight of acidic magnesium metasilicate as filler. A number of other fillers can moreover be present, and boron nitride is one possibility mentioned here. However, there is no explicit disclosure of the combination polyarylene ether ketone/acidic magnesium metasilicate/boron nitride.

The object of the invention consists in, starting from the prior art, providing a foil which is made of a polyarylene ether ketone molding composition and which, when compared with the prior art, exhibits lower shrinkage and reduced area coefficient of thermal expansion.

Said object is achieved through a foil with thickness from 5 to 1200 μm, preferably from 8 to 600 μm, and particularly preferably from 10 to 400 μm, which comprises a layer made of a molding composition which comprises the following components:

a) from 60 to 96 parts by weight, preferably from 65 to 94 parts by weight, particularly preferably from 70 to 92 parts by weight, and with particular preference from 75 to 90 parts by weight, of polyarylene ether ketone, b) from 2 to 25 parts by weight, preferably from 4 to 22 parts by weight, particularly preferably from 6 to 19 parts by weight, and with particular preference from 8 to 16 parts by weight, of hexagonal boron nitride, and c) from 2 to 25 parts by weight, preferably from 4 to 22 parts by weight, particularly preferably from 6 to 19 parts by weight, and with particular preference from 8 to 16 parts by weight, of talc, where the sum of the parts by weight of components a), b), and c) is 100. The polyarylene ether ketone (PAEK) comprises units of the formulae

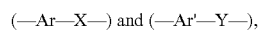

where Ar and Ar' represent a divalent aromatic moiety, preferably 1,4-phenylene, 4,4'-biphenylene, or else 1,4-, 1,5- or 2,6-naphthylene. X is an electron-withdrawing group, preferably carbonyl or sulfonyl, while Y is another group such as O, S, $CH_2$, isopropylidene or the like. At least 50% of the groups X here, preferably at least 70% and particularly preferably at least 80%, should represent a carbonyl group, while at least 50% of the groups Y, preferably at least 70%, and particularly preferably at least 80%, should be composed of oxygen.

In the embodiment that is in particular preferred, 100% of the groups X are composed of carbonyl groups and 100% of the groups Y are composed of oxygen. In this embodiment, the PAEK can by way of example be a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl groups and of the oxygen groups are naturally also possible.

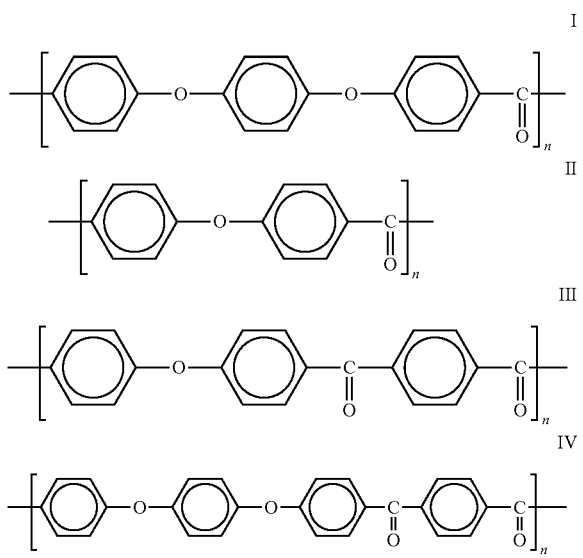

The PAEK is generally semicrystalline, and this is discernible by way of example in DSC analysis through observation of a crystallite melting point $T_m$ which in most instances is of the order of magnitude of 300° C. or thereabove. As a general rule, crystallinity is reduced by sulfonyl groups, biphenylene groups, naphthylene groups, or bulky groups Y, e.g. an isopropylidene group.

In one preferred embodiment, the viscosity number measured to DIN EN ISO 307 on a solution of 250 mg of PAEK in 50 ml of 96 percent by weight $H_2SO_4$ at 25° C. is about 20 to 150 cm$^3$/g, and preferably from 50 to 120 cm$^3$/g.

The PAEK can be produced by what is known as the nucleophilic route through polycondensation of bisphenols and of organic dihalogen compounds and/or of halophenols in a suitable solvent in the presence of an auxiliary base; the process is described by way of example in EP-A-0 001 879, EP-A-0 182 648 and EP-A-0 244 167.

However, the PAEK can also be produced in what is known as the electrophilic route in a medium which is strongly acidic or which comprises a high concentration of Lewis acid; this process is described by way of example in EP-A-1 170 318 and in the literature cited therein.

Hexagonal boron nitride is composed of layers of a planar, hexagonal honeycomb structure in which the B atoms and N atoms respectively occur in alternation. It is thus comparable with graphite; the physical properties of hexagonal boron nitride and graphite are very similar. However, unlike graphite, hexagonal boron nitride does not conduct electrical current until very high temperatures are reached. Various types of hexagonal boron nitride are commercially available.

In one preferred embodiment, the $d_{50}$ particle size of the hexagonal boron nitride is at least 0.1 µm, at least 0.2 µm, at least 0.3 µm or at least 0.4 µm, to and at most 10 µm, at most 8 µm, at most 6 µm, at most 5 µm, at most 4 µm, at most 3 µm, or at most 2 µm. The $d_{98}$ particle size is correspondingly at least 0.3 µm, at least 0.6 µm, at least 0.7 µm or at least 0.8 µm, and at most 20 µm, at most 16 µm, at most 12 µm, at most 10 µm, at most 8 µm, at most 6 µm or at most 4 µm. All of the upper and lower limits can be combined with one another both in the case of $d_{50}$ and also in the case of $d_{98}$.

The particle size is measured here by means of laser diffraction to ISO 13320, for example using a Mastersizer 2000 from Malvern Instruments GmbH.

Talc is a naturally occurring mineral of general chemical constitution $Mg_3Si_4O_{10}(OH)_2$. It is a crystalline magnesium silicate hydrate, belonging to the family of the phyllosilicates. Talc is described in more detail by way of example in Kirk-Othmer, *Encyclopedia of Chemical Technology*, 4th Edition, Vol. 23, John Wiley & Sons 1997, pp. 607 to 616.

In one preferred embodiment, the $d_{50}$ particle size of the talc is at least 0.1 µm, at least 0.2 µm, at least 0.3 µm or at least 0.4 µm, and at most 10 µm, at most 8 µm, at most 6 µm, at most 5 µm, at most 4 µm, at most 3 µm or at most 2 µm. The $d_{98}$ particle size is correspondingly at least 0.3 µm, at least 0.6 µm, at least 0.7 µm or at least 0.8 µm and at most 20 µm, at most 16 µm, at most 12 µm, at most 10 µm, at most 8 µm, at most 6 µm or at most 4 µm. All of the upper and lower limits can be combined with one another both in the case of $d_{50}$ and also in the case of $d_{98}$.

The particle size is measured here to ISO 13317, Part 3 (X-ray Gravitational Technique), for example using a Sedigraph 5120 from Micromeritics Instrument Corporation.

The polyarylene ether ketone molding composition can moreover, if necessary, also comprise further components, for example processing aids, stabilizers, or flame retardants. The type and amount are to be selected in such a way as to avoid any substantial impairment of the effect of the invention. It is moreover also possible to add silanes and/or oligomeric siloxanes, for example in proportions of from 0.5 to 2.5% by weight and preferably from 1 to 2% by weight, based on the entire formulation, in order to improve coupling of the fillers and in order to improve resistance to tear.

In one embodiment, the foil is composed only of the layer made of the polyarylene ether ketone molding composition of the claims. It can be produced by the following process:

a) in a compounding step, polyarylene ether ketone is mixed with hexagonal boron nitride and talc in the proportions of the claims, in the melt;

b) in an extrusion step, the melt of the molding composition of the claims is extruded in a slot die; and c) in a hardening step, the foil web shaped by extrusion is drawn off, laid on chill rolls, and cooled.

In the compounding step, the melt can be discharged, cooled and pelletized. The pellets are then remelted with shear in the extruder, in the extrusion step. However, it is also possible to operate in one stage, where the extrusion step follows the compounding step directly in the same machine. This method avoids pelletization, and this reduces cost; it can also achieve better foil quality.

In the course of the compounding step or extrusion step, the melt of the molding composition can, if necessary, be filtered, in order to remove specks.

Edge trim and wind-up can be carried out in a subsequent finishing step in a winder unit.

In another embodiment, the foil also comprises a metal layer. In this case, the foil is advantageously a laminate made of a single-layer foil made of the PAEK molding composition of the claims and of a metal foil. The lamination process can be carried out with the aid of an adhesive. These adhesives are prior art; the materials involved are mostly epoxy-, acrylate-, or polyimide-based or UV-curing systems, or are copolyesters. For high-temperature applications, these adhesives have to resist high temperatures. The adhesives generally have to be crosslinked in order to comply with the quality requirements and other requirements during soldering and subsequently in continuous use. In order to ensure that the laminates have the required functionality, specified bond strengths have to be achieved between PAEK foil and metal foil, prior to and after various aging processes. These adhesives are therefore heat-conditioned after production of the laminate, whereupon they undergo durable and stable crosslinking. This is advantageously permitted by the foil of the invention, since corrugation or curl is suppressed sufficiently for the application.

In the event that adhesion is not adequate for the selected purpose, the foil made of the polyarylene ether ketone molding composition can also be subjected to surface treatment, for example corona treatment or plasma treatment.

However, the metal layer can also be applied by other methods, for example electrolytically or by means of vacuum deposition processes. As an alternative to this, it is also possible to use a printing technique to apply conductive pastes doped by way of example with silver, with copper, or with carbon. The foil made of the PAEK molding composition can bear a metal layer either on one side or on both sides.

The thickness of the metal layer is generally from 0.1 to 150 μm. When a metal foil is used, the preferred range is from 17 to 105 μm, and the preferred range in the case of electrolytic vacuum deposition is from 0.1 to 40 μm.

The metal is usually copper, but it can also be aluminum or another metal.

Surprisingly, it has been found that simultaneous use of hexagonal boron nitride and talc as filler produces a synergistic effect. The total amount of filler that has to be added in order to achieve the desired effect is therefore smaller. It is therefore possible to produce foils of the invention with improved mechanical properties, for example with improved resistance to tear and to tear propagation.

The foil of the invention is used by way of example for circuitboards and in particular here for flexible circuitboards. In the latter application, the thickness of the PAEK foil layer is preferably from 6 to 150 μm, particularly preferably from 12 to 125 μm, with particular preference from 18 to 100 μm, and very particularly preferably from 25 to 75 μm.

The metal-coated PAEK foil can be used as what is known as base laminate for producing flexible circuitboards. In the first step, the conductor pattern is printed onto the metal layer or is applied by photolithographic processes. The etching and stripping process is then used to produce the conductor pattern. The procedure can then differ greatly, depending on the application. Examples of further steps in the process are drilling, stamping, surface finishing, use of electroplating for vias, production of multilayer systems in vacuum presses, lamination of outer foils using pressure and heat, printing of insulating coat or of solder resist, various soldering processes (e.g. solder paste printing or provision of components) and provision of contacting parts through crimping, piercing or other mechanical processes. Production of flexible circuitboards in this way is prior art.

The foils used according to the invention can achieve isotropic dimensional stability of a foil, i.e. both longitudinal stability and transverse stability, involving less than 0.1% dimensional change at temperatures up to 260° C. In order to simulate the conditions during production of an FCB, measurements are made here on a foil specimen of dimensions 20×20 cm, and specifically prior to and after 5 minutes of exposure to a temperature of 260° C. To this end, the shrinkage of the sheet of foil specimen is determined over 2 lengths and 2 widths, at a total of 8 measurement points. The intention here is to replicate the maximum temperature to which the foil is exposed under what is are known as solder bath conditions, by allowing a generously long exposure time, which in this case is more than five times the soldering times that occur in familiar soldering processes with exposure to a maximum temperature of 260° C. This ensures that the foil does not enter its region of borderline stability, and that the maximum longitudinal and transverse shrinkage of 0.1% after soldering is never exceeded.

An example of the effect also achieved by high dimensional stability in other applications is reduction of mechanical stresses in materials and components, and at soldering points, with a marked resultant improvement in quality in production and in continual use of finished products. Examples of suitable applications are cable insulation, winding foils for capacitors, and protective-covering foils and, respectively, backing foils for photovoltaic elements.

The invention is illustrated by examples below.

Compounding:

The materials PEEK, boron nitride (BN) and talc were mixed and pelletized in a Coperion (ZSK 26) plant with a corotating twin screw. The fillers were added by way of the first intake; however, the addition can also be conducted by way of sidefeeders. The processing temperature was about 370° C., and throughput was from 8 to 10 kg/h.

Foil Production:

Foils of thickness 50 μm were then produced on a Dr. Collin foil extrusion plant using a three-zone screw and the following process parameters: processing temperature about 370° C., throughput about 2 to 3 kg/h, take-off speed 5 m/min, roll temperatures: from 180 to 250° C.

Testing:

a) Curl:

An A4 piece of the resulting 50 μm foil was laminated with a copper foil (35 μm) and epoxy resin adhesive (7 μm) and then conditioned at 120° C. for 48 h. The extent to which the four corners of the laminate had lifted was then measured and averaged.

b) Thermomechanical Analysis (TMA):

A scalpel was used to cut a strip of the foil sample to size (length 16 mm, width 4 mm), and it was clamped into the clamps of TMA equipment (Netzsch TMA 202). The equipment was used to determine the change in length as a function of temperature in the temperature range from 80 to 120° C. (temperature range relevant for the lamination process).

c) Shrinkage:

A square was cut out from the foil sample and electronic scale measurement equipment was used to measure width transversely and longitudinally at two points. The specimen was conditioned at 260° C. for 5 minutes; the change in width in the respective directions was then determined (data in %). The value is intended to be as close as possible to zero.

Table 1 gives the results.

TABLE 1

Molding compositions and results

| | Constitution [% by wt.] | | | Curl [mm] | TMA (techn. alpha) | Shrinkage [%] | |
|---|---|---|---|---|---|---|---|
| | PEEK | Talc | BN | | | Longitudinal | Transverse |
| Comparative example 1 | 90 | 10 | | 36 | 37 | −0.32 | −0.20 |
| Comparative example 2 | 90 | | 10 | 34 | 38 | −0.10 | −0.08 |
| Inventive example 1 | 90 | 5 | 5 | 31 | 35 | −0.05 | −0.03 |

The comparison shows that the invention improves the curl of the laminate, the thermal expansion of the foil, and the shrinkage of the foil.

What is claimed is:

1. A foil, comprising a layer of a molding composition, comprising:
   from 60 to 96 parts by weight of polyarylene ether ketone,
   from 2 to 25 parts by weight of hexagonal boron nitride, and
   from 2 to 25 parts by weight of talc,
   based on 100 total parts by weight of polyarylene ether ketone, hexagonal boron nitride, and talc,
   wherein
   a $d_{50}$ particle size of the boron nitride to ISO 13320 is at least 0.1 μm and at most 10 μm, and a corresponding $d_{98}$ is at least 0.3 μm and at most 20 μm,
   a $d_{50}$ particle size of the talc to ISO 13317, Part 3 is at least 0.1 μm and at most 10 μm, and a corresponding $d_{98}$ is at least 0.3 μm and at most 20 μm the polyarylene ether ketone comprises a unit of formula:

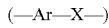

(—Ar—X—)

and a unit of the formula:

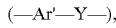

(—Ar'—Y—), wherein Ar and Ar' are each independently a divalent aromatic moiety,
   each X is independently an electron-withdrawing group,
   at least 50% of X groups are carbonyl groups,
   each Y is independently O, S, $CH_2$, or isopropylidene, and
   at least 50% of Y groups are O; and
   the layer of the molding composition has a thickness of 5 to 100 μm and has a dimensional change of less than 0.1% in both a longitudinal and transverse direction at temperatures up to 260° C.

2. The foil of claim 1, comprising:
   from 75 to 90 parts by weight of polyarylene ether ketone,
   from 8 to 16 parts by weight of hexagonal boron nitride, and
   from 8 to 16 parts by weight of talc.

3. The foil of claim 1,
   wherein Ar and Ar' are each independently 1,4-phenylene; 4,4'-biphenylene; 1,4-naphthylene; 1,5-naphthylene; or 2,6-naphthylene.

4. The foil of claim 1,
   wherein at least 70% of X is a carbonyl group, and at least 70% of Y is O.

5. The foil of claim 1,
   wherein the polyarylene ether ketone is a polyether ether ketone (PEEK), a polyether ketone (PEK), a polyether ketone ketone (PEKK), or a polyether ether ketone ketone (PEEKK).

6. The foil of claim 1,
   wherein a $d_{50}$ particle size of the boron nitride to ISO 13320 is at least 0.4 μm and at most 6 μm.

7. The foil of claim 1,
   wherein a $d_{50}$ particle size of the talc to ISO 13317, Part 3 is at least 0.4 μm and at most 5 μm.

8. The foil of claim 1, further comprising:
   a silane, an oligomeric siloxane, or both.

9. The foil of claim 1, wherein the thickness of the foil is from 10 μm to 100 μm.

10. The foil of claim 1, further comprising:
    a metal layer.

11. The foil of claim 10, wherein a thickness of the metal layer is from 0.1 to 150 μm.

12. The foil of claim 10, wherein the foil is obtained by a process comprising laminating, electrolytically applying, or vacuum depositing the metal layer.

13. The foil of claim 10
    wherein the metal layer comprises copper or aluminum.

14. The foil of claim 1, further comprising:
    a conductive paste.

15. A process for producing the foil of claim 1, comprising:
    mixing, in a melt, from 60 to 96 parts by weight of polyarylene ether ketone, from 2 to 25 parts by weight of hexagonal boron nitride, and from 2 to 25 parts by weight of talc, based on a total of 100 parts by weight of polyarylene ether ketone, hexagonal boron nitride, and talc,
    extruding the melt in a slot die to obtain a foil web, and
    placing the foil web onto a chill roll to harden the web.

16. The process of claim 15,
    wherein the extruding directly follows the mixing in the same machine.

* * * * *